United States Patent [19]

Hirota

[11] 3,754,974

[45] Aug. 28, 1973

[54] METHOD AND AGENT FOR PREVENTING COATING FILMS FROM PEELING

[76] Inventor: Nobuyoshi Hirota, Nagasaki-shi, Nagasaki-ken, Japan

[22] Filed: Dec. 22, 1971

[21] Appl. No.: 211,060

Related U.S. Application Data

[63] Continuation-in-part of Ser. No. 876,582, Nov. 12, 1969, abandoned.

[52] U.S. Cl. ............... 117/75, 117/63, 117/92, 117/94, 117/132 BE
[51] Int. Cl. ............... B44d 1/14, B44d 1/34
[58] Field of Search ........... 117/75, 92, 63, 132 BE, 117/72

[56] References Cited
UNITED STATES PATENTS

| | | | |
|---|---|---|---|
| 2,765,288 | 10/1956 | Whittier et al. | 117/132 BE X |
| 2,976,256 | 3/1961 | Whittier et al. | 117/132 BE X |
| 2,949,380 | 8/1960 | Stuart | 117/75 X |
| 3,108,898 | 10/1963 | Nitzsche et al. | 117/75 |
| 2,883,348 | 4/1959 | Pechukas | 260/429.5 X |
| 3,123,582 | 3/1964 | Tryzna | 117/132 BE X |
| 2,511,013 | 6/1950 | Rust et al. | 260/429.5 X |
| 3,619,255 | 11/1971 | Lengnick | 117/75 |
| 3,390,007 | 6/1968 | Bonner et al. | 117/132 BE |
| 3,024,130 | 3/1962 | Kish | 117/92 X |

*Primary Examiner*—Ralph Husack
*Attorney*—John J. McGlew et al.

[57] ABSTRACT

An anti-peeling agent containing a mixture of 1. a substance whose molecule is partly composed by a functional atomic group reactive to the epoxy and the hydroxyl group or both, in film forming molecules, and which forms a chemical bond between two identical or different coating films and 2. an organic solvent which is capable of permeating rapidly through the surface of a film to be coated in completely cured condition and to activate it. The substance (1) is selected from (a) organosilane compounds containing in one molecule more than two different kinds of functional groups and (b) derivative compounds prepared by the reaction of an alkoxide compound or organic complex compound of titanium or aluminum with an epoxy resin which is cross-linked therewith. The invention also relates to a method for preventing subsequently applied overcoating films from peeling by application of the anti-peeling agent to coated iron and steel surfaces.

15 Claims, No Drawings

METHOD AND AGENT FOR PREVENTING COATING FILMS FROM PEELING

REFERENCE TO CO-PENDING APPLICATION

This application is a continuation-in-part of copending application Ser. No. 876,582 filed Nov. 12, 1969 for "ANTI-PEELING AGENT", now abandoned.

BACKGROUND OF THE INVENTION

This invention relates to a method and an agent for preventing coating films from peeling; the improvement is due to highly increased adhesion when to the surface of a perfectly cured coating film of the three-dimensional network curing type another coating material, such as tar epoxy resin, is applied, both coating materials being of identical or different types. Tar epoxy resins have been used of late extensively and in large quantities for anti-rusting coatings on iron and steel surfaces of oil tanks and ballast tanks of tankers. This coating material consisting of a mixture of epoxy resin with bituminous material (coal tar, tar pitch, coal-digested tar pitch and others) as its main component when applied after adding either one or both curing agents of polyamine and polyamide thereto, cures by polymerization of the main ingredient with the curing agent to form a coating film. This cured film is very stable against organic solvents as well as various chemical agents because it constitutes a high-molecular weight compound of a three-dimensional network structure. That state of a coating film is reached at normal temperature approximately 5 to 7 days after coating. This time lag gives rise to serious deficiencies in the process of applying an overcoat paint when necessary. That is to say, when to a coating film which has attained the perfectly cured or almost perfectly cured state after more than 5 days at normal temperature after coating, or accelerated curing in other conditions, a coating material of identical type (or different type) is applied, the affinity of the coating films to each other deteriorates, thereby decreasing the adhesion between these films, consequently, film-peeling occurs under mechanical action from outside, which considerably decreases the durability of coatings and does not ensure the desired rust-preventing effect. As a measure for preventing coatings of films from peeling, pretreatments have generally been used, such as roughening of the film surface by a disc sander, or wiping of the film surface with the use of a paint thinner, but such treatments have required an increased number of man-hours and yet their effect has been unsatisfactory. Therefore, application of tar epoxy paint is restricted by the requirement of planning the coating process under strict observation of the drying time specified by its maker, and according to a ship construction method in general use after the required amount of painting has for the most part been completed in an onshore painting shop, or in the open air at the time of machining of blocks of a ship, the ship body is constructed by joining the blocks together in a dock. However, in the process of construction, coating films may be seriously burned as a result of welding of accessories, or correction of deflection of outer plating and cutting operations, and may also be extensively damaged by some bodies colliding against each other. Moreover, as it is obvious that joints of blocks are subject to burning at the time of welding, their end portions are left unpainted over a certain width, until the blocks have been joined, and when coating these portions it is necessary to apply overcoat paint over a certain width of coating film applied onshore. The coating film applied onshore to these portions which have passed a fairly long period of time after its application, may give rise to the above-mentioned peeling phenomenon. Therefore, it was indispensable, according to prior known methods, to perform the above-mentioned pretreatment by a disk sander or with the use of a thinner before application of corrective or thorough coating. However, as these pretreatments must be carried out inside a tank restricted by unfavorable conditions, such as complicated construction, poor illumination and ventilation, limited scaffolding, and small working area, it is very difficult to carry out these operations to near perfection, and the required pretreatments and considerably increase the number of man-hours without giving satisfactory results.

This invention is quite different in function and construction from prior known methods and aims at producing a chemical bond between the cured coating film and an overcoat film by such simple means as spraying a chemical agent or applying it with a brush to the first-mentioned film in order to obtain high adhesion between both films, thereby eliminating troubles arising from the above-mentioned peeling phenomenon and contributing to the reduction in painting cost.

SUMMARY OF THE INVENTION

The composition being of prime importance in this invention is obtained by incorporating organic compounds mentioned below into an organic solvent prepared in such a manner that when the surface of a perfectly cured coating film of tar epoxy resin is rapidly permeated in several minutes at normal temperature, hydroxyl groups produced by the initial polymerization of the epoxy resin and hydroxyl groups remaining in the bituminous material or the epoxy group remaining unreacted in a small quantity, may be exposed on the top layer of the coating film and activated to easily react with one of the following compositions:

1. Organosilane compounds containing in one molecule more than two different kinds of functional groups such as a vinyl group ($CH_2=CH-$), an epoxy group

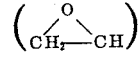

an amino group ($NH_2-$), a glycidyl group

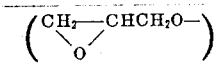

an alkoxyl group ($OR-$, R: $C_1-C_2$), and an acetoxyl group ($OCH_3$, $CO-$).

2. Derivative compounds prepared by the reaction of an alkoxide compound or organic complex compound of titanium or aluminum with an epoxy resin or organic matter containing epoxy resin which is cross-linked therewith. (In this case the titanium or aluminum compound must be in excess over the chemical equivalent of the epoxy compound.)

A detailed explanation of these compositions will be given hereinafter.

DESCRIPTION OF THE PREFERRED EMBODIMENTS (Percentages shown hereinafter are by weight.)

The first composition is obtainable by incorporating 1.0–30 percent of an organosilane compound having more than two different reactive groups bound to the silicon atoms in the molecule, into a mixed solvent containing more than two solvents selected from at least two groups of organic solvents, such as halogenated hydrocarbon, aromatic hydrocarbon, ester or ketone. The use of a mixed solvent containing more than two solvents as mentioned above is for the purpose of obtaining high permeability for three-dimensional network curing type coating materials of high solvent resistance. As the above mentioned organosilane compounds which can be generally used, we mention silane compounds having the general formula $RSiX_3$ (wherein R represents a vinyl, aryl, epoxy, acrylo, amino or glycidyl group, and X represents an alkoxyl, silanol, acetoxyl or halogen group): for example, paraaminophenyl-trihydroxysilane, vinyl-trichlorosilane, aryltrichlorosilane, γ-glycidoxy-propyl-trimethoxysilane, vinyl-tris-(β-methoxyethoxy)-silane, vinyl-triethoxysilane, β-(3,4-epoxy-cyclohexyl)-ethyl-trimethoxysilane, γ-methacryloxy-propyl-trimethoxysilane, n-(dimethoxymethylsilyl-propyl)-ethyl-enediamine, n-(trimethoxysilyl-propyl)-ethylene-diamine, P-aminophenyl-trihydroxysilane, β-aminoethyl-triacetoxysilane. The incorporation ratio of this organosilane compound to the mixed solvent should be, as mentioned above, 1.0–30 percent. If the ratio is less than 1.0 percent, improvement of adhesion mentioned later between the first and second films will not be obtained, and if the ratio exceeds 30 percent, it will become difficult to apply the solution to the first coating film by the usual means, such as spraying and application with a brush. As a drop-preventive agent, colloid silica powder is best suited. This powder has the function of preventing the film adhesive of this invention of forming a deposit and rendering it capable of retaining liquid on the surface of the coating film. The suitable quantity of powder to be added is 1–5 percent. Coloring agents may additionally be added when necessary.

The film adhesive to be formed as mentioned above markedly improves the adhesion between the first coating film of the three-dimensional network curing-type coating material and the second coating film to be placed on the first film by the following action. That is to say, when to the perfectly cured first coating film of three-dimensional network curing-type said adhesive is applied, at first the mixed solvent contained in the adhesive will rapidly permeate and dissolve the surface of the first coating film and activate it. As the first film, though perfectly cured, contains in the molecule polar groups, such as an epoxy group remaining unreacted and a hydroxy group remaining unreacted or produced as a result of reaction, these groups will be oriented on the surface of the coating film under the action of said mixed solvent and then react with a reactive group bound to the silicon atom of the organosilane compound which is contained in the film adhesive, as a result of which the first coating film will chemically be combined with the film adhesive applied to that film. And when a coating material of the identical or different type is applied thereto to form the second coating film, that reactive group of the organosilane compound, which did not take part in the reaction with the first coating film, will react and be chemically combined with a reactive group present in the second coating film and, accordingly, the first and second films will be chemically combined and thereby firmly bound to each other under the cross-linking effect of the organosilane compound contained in the film adhesive. This aspect will be understood by the explanation which follows. It is, however, to be noted that in the following cases the second coating film consists of the same material as the first one. In the following formula, atoms in the main chain are not shown. In the case of the first and second coating films consisting of the coating material of tar epoxy resin, the reactions proceed as follows:

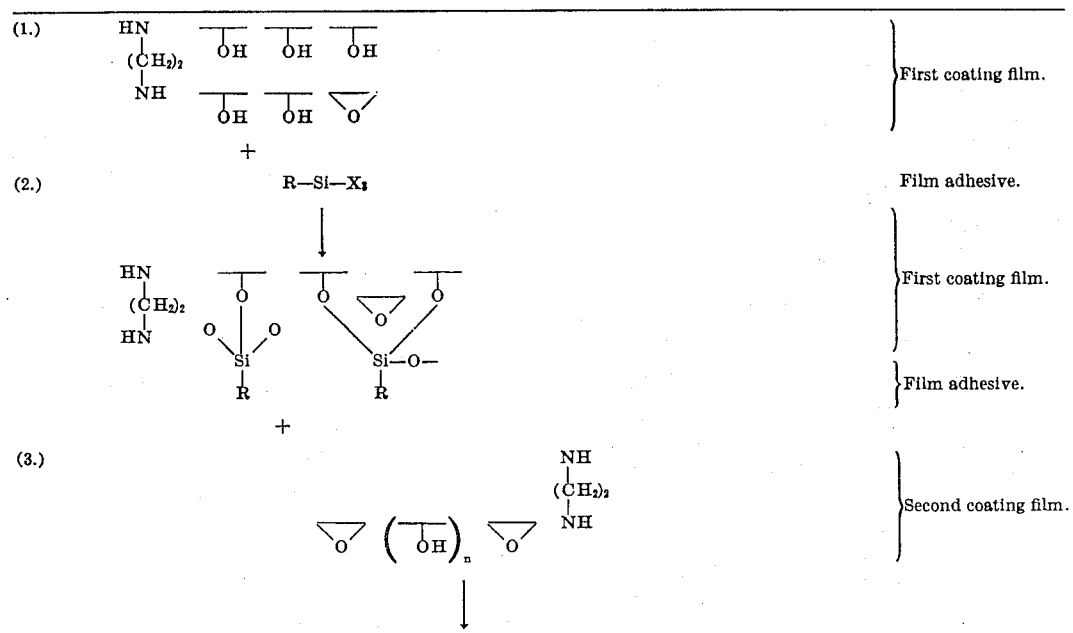

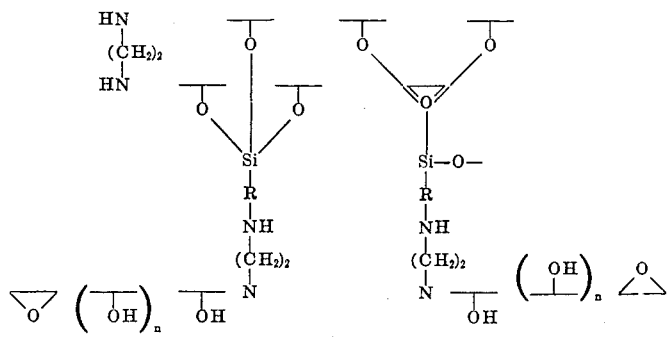

To explain the above-illustrated formulae, the formula (1.) illustrates the state wherein as a result of activation of the cured resin formed by reaction of epoxy resin with polyamine or polyamide under the effect of the mixed solvent contained in the film adhesive, the hydroxy group in the molecule of the resin is oriented on the surface. The formula (2.) shows that this hydroxy group reacts with the organosilane compound in the film adhesive and is bound to the silicone atom. When the second coating film is then placed thereon, polyamine or polyamide incorporated in that film leads to ring opening of the epoxy group and glycidyl group and polymerization will occur, as shown in formula (3.), and thus the first and second coating films will be firmly bound under the cross-linking effect of the organosilane compound.

When an aminosilane compound is used as said organosilane compound, the amino group displays the same effect as polyamine or polyamide in the curing reaction of epoxy resins and, therefore, in this case between the first coating film and the aminosilane compound ring-opening polymerization may take place, as shown in formula (3.). In such a case, other reactive group (for example, the silanol group, acetoxyl group and others) bound on the opposite side of the amino group of the aminosilane compound, reacts with the hydroxyl group or epoxy group in the second coating film.

The second of the above mentioned bonding compositions is obtainable by incorporating titanium alkoxide, aluminium alkoxide or their chelate compounds into the mixed solvent used in the first composition and it is characterized in that its main component consists of a mixture containing reacted and unreacted products obtained by adding 1.5–5 mols of titanium alkoxide, aluminum alkoxide or their chelate compounds to one mol of a compound having an epoxy group and causing them to react.

As compounds having an epoxy group the following substances can favorably be used: for example, epoxy resin or its reactive diluent, i.e., epoxidated bean oil (reactive diluent of epoxy resin), olefine oxide, phenyl-glycidyl-ether, butyl-glycidyl-ether, octylene oxide, propylene oxide, aryl-glycidyl-ether, styrene oxide, epichlorohydrin, dodecane oxide, pinene oxide, limonene oxide. Particularly epoxy resin of molecular weight of 900–1,000 is best suited but others are likewise usable. Also usable is a mixture of more than two compounds having epoxy groups.

A preferred alkoxide of titanium or aluminum includes alkoxy groups ranging from $C_3H_7O-$, $C_4H_{10}O-$ up to $C_{18}H_{37}O-$. Thus, a preferred alkoxide contains from a minimum of 12 carbon atoms to a maximum of 72 carbon atoms. As titanium alkoxide or its chelate compound are suited: tetraisopropyl-titanate, tetra-n-butyl-titanate, tetra-2-ethyl-hexyl-titanate, butyl-titanate dimer, isopropyl-stearyl-mixed alkyl-titanate (those above-mentioned are alkoxides), titanium acetyl-acetonate, triethanol-amine-titanate, titanium-ammonium-lactate, titanium-ethyl-lactate, titanium-octylene-glycilate (those are chelate compounds). Moreover, as aluminium alkoxide or their chelate compounds are suited: aluminium-isopropylate, aluminium-secondary-butylate (those are alkoxides), methyl-aceto-acetate-aluminium-diisopropylate (chelate compound). The bonding action is then brought about according to this embodiment of the invention by adding titanium alkoxide, aluminium alkoxide or their compounds indicated above, to an epoxy group-containing compound or a mixture of such compounds, in the proportion of 1.5 – 5 mols per one mole of epoxy group-containing compound, and causing them to react with each other. In this case it is favorable to use the mixed solvent having rapid permeability used in the first bonding composition for the aforesaid perfectly cured resin of the three-dimensional network curing type. Such a solvent usually is a mixed solvent but it is, of course, possible to use a solvent of a single component if the desired effect is obtainable. However, the use of a solvent containing water or hydroxyl groups in the molecule is undesirable. Mixed solvents, each consisting of three components, e.g., chloro-methylene, isobutyl ketone and toluene; trichlorethylene, methyl-ethyl ketone and toluene; carbon tetrachloride, isobutyl ketone and xylene, are examples of best suited solvents. By the way, the reason why, according to this invention, the quantity of titanium alkoxide, aluminium alkoxide or their chelate compounds to be added to the compound having an epoxy group is subject to the above mentioned limitations, is that when the quantity is below the lower limit, the formation of a rough surface oxidation film produced by hydrolysis of this compound is not complete and the full effect of improved adhesion cannot be expected; on the other hand, when the quantity is above the upper limit, the formation of the rough surface oxidation film is excessive, which rather reduces the adhesion and is uneconomical. A suitable quantity of a pigment, weighting agent or coloring agent may also be added, as it does not harm the effect of the film adhesive of this invention.

The compositions of this invention improve the adhesion between coating resins due to the following action. However, the action mentioned below pertains only to the case wherein on the first coating film of tar epoxy resin a second coating film is placed of the same coating material in the presence of the composition of this invention therebetween and, furthermore, a solvent for this composition is used which has rapid permeability in regard to said first coating film.

At first, in the bonding composition a reaction product is present, which will be referred to hereinafter as partial reaction type organic matter, shown at the right side of the following formula. That is to say,

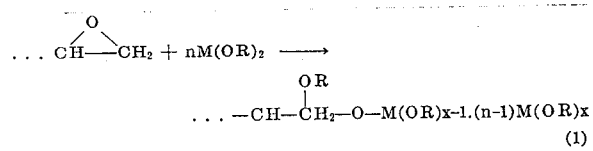

(wherein $n$ and $x$ are integral numbers, M represents Al or Ti, and R represents an alkyl group.) If this composition is applied to the first coating film, at first the surface of the first coat is permeated by the solvent contained in the composition, the hydroxyl group produced by initial polymerization of the tar epoxy resin or the hydroxyl group remaining in bituminous material, is activated, and with this hydroxyl group, said partial reaction type organic matter is combined, as follows:

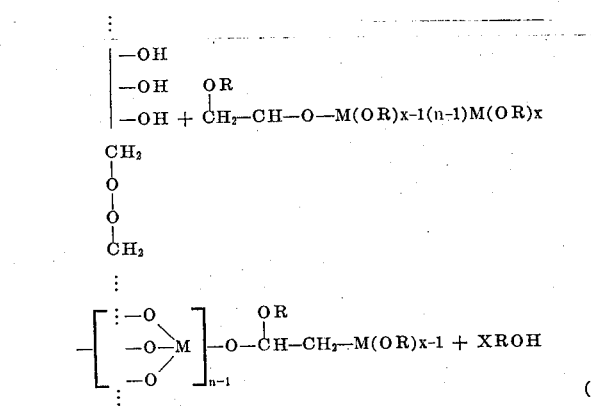

If the second coating film is then placed thereon, the metal alkoxyl group, i.e. $[-M(OR)_{x-1}]$ is combined with the hydroxyl group in the second coating film, as follows:

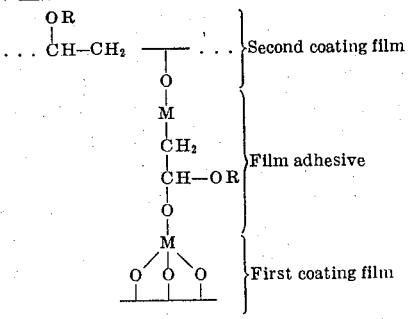

When, on the right side of the formula 2, $X = 1$, that is to say, in a state in which the metal compound is completely consumed by combination with the first coating film, the right side of formula 2 will be:

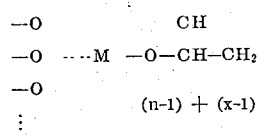

In this case, an atomic group combined with the metal, i.e.,

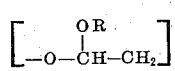

group having high affinity to the resin, the composition and the second coating film dissolve each other and bind to each other.

The composition of this invention improves the adhesion between the first and second coating films of tar epoxy resin, as mentioned above. Another feature of this composition is that the compound contained therein and having an epoxy group prevents the diffusion of solvent which may take place during the time from application by a sprayer or brush of this composition to the first coating film to activation of said coating film through permeation of solvent, and thus makes the solvent display its full effect. In addition to said tar epoxy resin, these actions are effective for other epoxy resins and other common synthetic coating materials and adhesives, and in these cases, an effect similar to that for tar epoxy resin can be obtained.

The effect of this invention will now be illustrated by the following examples in which parts are by weight unless otherwise indicated. In the examples, the paints employed are described as follows:

| Tar Epoxy Resin Coating | Biscon No. 1000 (Chugoku Toryo Co) | Bitulack No.203 |
|---|---|---|
| Specific Gravity | 1.1 – 1.2 | 1.3 – 1.4 |
| Drying time at 20°C | 24 hrs. | 24 hrs. |
| Bending Test | good | good |
| Adhesion Test | good | good |
| Salt water resistance | good (1 year) | good (1 year) |
| Oil resistance | good (1 year) | good (1 year) |
| Acid and Alkali resistance | good | good |
| Color | black, but may be reddish brown or silver brown | same as Biscon No. 1000 |

| Kind of Paint | Unsaturated Polyester Resin Paint | Alkyd Paint |
|---|---|---|
| Name of Brand | Polymal YH–6302 (Takeda Yakuhin Co.) | Eva Marine 2L (Chugoku Toryo Co.) |
| Type of resin | iso-phthalic acid type | phthalic acid type |
| Specific gravity | 1.10 (at 25° C) | 1.30 (at 20°C) |
| Viscosity (at 25°C poise) | 14 | — |
| Setting time | 0.5 – 1.0 hrs. | — |
| Drying time | — | 10 hrs. |
| Salt water resistance | — | good |
| Oil resistance | — | good |
| Non-volatile matter | — | more than 50 weight % |

The colloid silica powder used in the examples is described as follows:

This agent is the article of DEGUSSA firm, West Germany and its commercial name is AEROSIL.

| Fineness | 5–20 mμ |
|---|---|
| Surface area | 300±30 m²/g |
| PH | 3.6–4.2 (in 4% aqueous suspension) |
| Refractory index | 1.45 |
| Heat conductivity | 0.022 Kcal/m.h.°C (at 0°C) |
| SiO₂ | 99.8% or more |

EXAMPLE 1

| γ-glycidoxy-propyl-trimethoxysilane | 20 parts |
|---|---|
| Methylene chloride | 68 parts |
| Methyl alcohol | 5 parts |
| Cellosolve | 5 parts |
| Colloid silica powder | 2 parts |

To the tar epoxy coating film (first film) exposed outdoors for 2½ months after coating, the above-mentioned composition was applied by a sprayer and dried in that condition for 24 hours at normal temperature. A paint of the same kind as the first film was then applied thereto in the thickness of 150 microns by an air sprayer, held at 35°C for 48 hours, and cured. Thereafter, the degree of adhesion between both films was measured by the cross-cut method. The degree of adhesion was 100 percent, that is to say, the adhesion between both films proved very good.

For the purpose of comparison, the second film was placed on the first film the same way as stated above without using the bonding composition, but in that case, the degree of adhesion between both films was only 3 percent, that is to say, the adhesion therebetween proved very inferior.

Furthermore, for the purpose of comparison, the second film was placed on the first film in the same way as in Example 1, using a composition similar to that used in Example 1, except that the mixed solvent in which the organosilane compound is incorporated was substituted by a single solvent of xylene, solvent naphtha or ethyl cellosolve. In that case, the degree of adhesion between both films varied only slightly as compared with the above-described case of using no bonding composition, and an improvement of the adhesion was scarcely observed.

EXAMPLE 2

| | |
|---|---|
| Para-aminophenyl-trihydroxysilane | 5 parts |
| Methylene chloride | 80 parts |
| Methyl alcohol | 5 parts |
| Cellosolve | 8 parts |
| Colloid silica powder | 2 parts |

To the tar epoxy coating film (first film) exposed outdoors for 2½ months after coating, the above-mentioned composition was applied by a sprayer and dried in that condition for 4 hours at normal temperature. A paint (second film) composed of a resin of the same kind as the first film was then applied thereto in the thickness of 150 microns by a sprayer and dried in that condition for 7 days at normal temperature. Thereafter, the degree of adhesion between both films was measured by the cross-cut method. The degree of adhesion was 100 percent, that is to say, the adhesion proved very good.

EXAMPLE 3

| | |
|---|---|
| γ-methacryloxy-propyl-trimethoxysilane | 30 parts |
| Methyl-isobutyl-ketone | 20 parts |
| Methyl alcohol | 20 parts |
| Toluene | 15 parts |
| Monochlorobenzene | 13 parts |
| Colloid silica powder | 2 parts |

The degree of adhesion between both films formed in the same way as in Example 2, but using the above-illustrated composition as the agent for preventing the coating films from peeling, indicated 100 percent according to the same measuring method as mentioned above.

Colloid silica powder used in Examples 1 - 3 may be omitted under certain circumstances.

EXAMPLE 4

100 gr of EPICOAT 1001 (trade name for product by the Shell Oil Co., Ltd.) was dissolved in a mixed solvent consisting of 80 parts by volume (parts hereinafter used are by volume) and methylene chloride, 10 parts of methyl-isobutyl-ketone and 10 parts of toluene. Moreover 30 gr of aluminium-isopropylate $Al(OC_3H_7)_3$ were dissolved in 100 ml of solvent of the same composition as mentioned above. These solutions were mixed at normal temperature and stirred for approximately 3 hours. The composition thus obtained was then kept in a sealed vessel. In this case, the molar ratio of epoxy resin (EPITCOAT 1001) to aluminium-isopropylate was approximately 1 : 3.

This composition or its solutions diluted by a solvent of the same composition by 5, 10, 20 and 40 times, respectively, were applied by a sprayer to the coating film of tar epoxy paint exposed outdoors from 1 month after coating, and were kept in that condition for 24 hours at normal temperature. Furthermore, a paint of the same kind was then applied thereto and dried for 7 days at normal temperature. The degree of adhesion between both coating films thus obtained was measured by the cross-cut method. Results thereof are listed in the table which will be given later.

For the purpose of comparison, to the coating film of tar epoxy paint exposed outdoors for one month after coating, a paint was applied of the indentical type to the former without using the bonding composition, and it was dried at normal temperature for 7 days. The adhesion between both films was measured in the same way as in the above-described example. Results thereof are given in the table below.

From these comparisons it will be understood that the bonding composition in the above-described example shows excellent improvement of adhesion between coating films in regard to perfectly cured coating film of tar epoxy resin.

EXAMPLE 5

100 gr of Paraplex G-62 (trade name for epoxy bean oil, i.e., reactive diluent of epoxy resin by the Rohm and Haas Co., Ltd.) was dissolved in a mixed solvent consisting of 80 parts of trichlorethylene, 10 parts of methyl-ethyl-ketone and 10 parts of toluene. Moreover, 55 gr of tetra-isopropyltitanate Ti $(OC_3H_7)_4$ was dissolved in 100 ml of solvent of the same composition as mentioned above. These solutions were mixed at normal temperature and stirred for approximately 3 hours. The composition thus obtained was then kept in a sealed vessel. In this case, the mixing proportion of Paraplex and tetra-isopropyl-titanate was approximately 1 : 2.

This composition was used for the adhesion between coating films in the same way and under the same conditions as in Example 4 and its adhesion was measured by the cross-cut method. Results thereof is given in the table below. As is apparent from this table, this composition displayed an effect similar to that in Example 4.

EXAMPLE 6

100 gr of olefin oxide

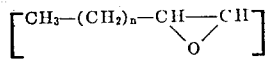

(mixture of $n = 13$ (60 percent by weight)/$n = 15$ (60 percent by weight)) was dissolved in a mixed solvent consisting of 80 parts of carbon tetrachloride, 10 parts of methyl-isobutyl-ketone and 10 parts of xylene (these parts are by volume. Moreover, 70 gr of titanium acetate [$Ti(O_2-CH_2-CH(CH_3)_2)_4$] were dissolved in 100 ml of solvent of the same composition as mentioned above. These solutions were mixed at normal temperature and stirred for about 3 hours. The composition thus obtained was then kept in a sealed vessel. In this case, the molar ratio of Olefine oxide to titanium-acetyl-acetate was approximately 1 : 1.5.

This composition was used for effecting the adhesion between coating films in the same way and under the same conditions as in Example 4 and the adhesion was measured by the cross-cut method. Results thereof are given in the table below. As is apparent from this table, this composition displayed an effect similar to that in Example 4.

TABLE: Comparison of adhesion according to the cross-cut method shown in vertical columns 3-7:

TABLE.—COMPARISON OF ADHESION ACCORDING TO THE CROSS-CUT METHOD SHOWN IN VERTICAL COLUMNS 3-7

| Coating film | Adhesive | Dilution by times | | | | |
|---|---|---|---|---|---|---|
| | | 1 | 5 | 10 | 20 | 40 |
| Tar epoxy resins. | Example: | | | | | |
| | 4 | 95 | 100 | 100 | 100 | 90 |
| | 5 | 100 | 100 | 100 | 100 | 93 |
| | 6 | 100 | 100 | 100 | 100 | 90 |
| | Control | | | 0 | | |

9 -7:

In the case of dilution by 40 times, in Example 4, the percentage of the sum of EPICOAT 1001 and Al-isopropylate to the total composition is approximately 1.0 percent by weight. In the case of dilution by one time, in Example 6, the percentage of the sum of olefine oxide and titanium acetate to the total composition is approximately 46 percent (increasing this percentage up to 50 percent is allowable). In other cases, the percentage of the sum of compound containing an epoxy group and titanium or aluminium alkoxide on their compounds to the total composition can be included in the range of 1.0 to 50 percent. At a concentration below 1.0 percent and over 50 percent, the adhesion effect is reduced.

EXAMPLE 7

Compositions in Examples 1, 4 and 6 were applied to the following coating combinations:

| (First coating film) | (Second coating film) |
|---|---|
| (1) Epoxy resin paint | Epoxy resin paint |
| (2) Epoxy resin paint | Tar epoxy paint |
| (3) Unsaturated polyester resin paint | Unsaturated polyester resin paint |
| (4) Tar epoxy paint | Alkyd resin paint |

In all these cases the first coating film was exposed outdoors for 3 months after coating, and the second coating film was dried for 7 days at room temperature. For the measurement of adhesion, the same method was used as in the above-cited examples. As shown in the following table, in all these cases improvement of adhesion was obtained.

ADHESION SHOWN IN VERTICAL COLUMNS

| Coating combination | Composition | | | | | |
|---|---|---|---|---|---|---|
| | 1 | | 4* | | 6* | |
| | Not applied | Applied | Not applied | Applied | Not applied | Applied |
| (1) | 30 | 100 | 28 | 100 | 32 | 100 |
| (2) | 25 | 100 | 29 | 100 | 27 | 100 |
| (3) | 20 | 100 | 25 | 100 | 30 | 100 |
| (4) | 50 | 100 | 45 | 100 | 40 | 100 |

*The asterisk shows dilution by 5 times.

What is claimed is:

1. A method of preventing peeling of films on metal surfaces having a tar epoxy resin undercoating film thereon, which comprises
   1. preparing a bonding composition by mixing together
      i. a first component which comprises a member selected from the group consisting of:
         a. from about 1.0 to about 30 percent by weight of an organosilane having the formula $R-SiX_3$ wherein R is vinyl, epoxy, acrylo, amino or glycidyl, and X is alkoxyl having from one to two carbon atoms, acetoxyl or halogen; and
         b. from about 1 to about 50 percent by volume of a mixture containing ($\alpha$) a member selected from the group consisting of titanium alkoxide, aluminum alkoxide and chelates thereof, said alkoxide having from three to 18 carbon atoms; and ($\beta$) at least one epoxy bearing compound having a molecular weight up to about 1,000, the proportion of component ($\alpha$) to component ($\beta$) being from about 1.5 – 5 moles ($\alpha$) to 1 mole ($\beta$); and (ii) a second component which comprises a normally liquid organic mixed solvent, which is capable of permeating rapidly and activating the surface of said under-coating film in substantially completely cured condition, said mixed solvent containing more than two solvents selected from at least two groups of organic solvents consisting of halogenated hydrocarbon, aromatic hydrocarbon, ester and ketone solvents,
   2. applying a coating of said bonding composition to the tar epoxy resin coated surfaces, which have undercoating film coated directly thereon in substantially completely cured condition, and prior to the application of an overcoat paint to the coated surfaces,
   3. allowing said bonding composition to dry prior to application of overcoat paint to said surface, and
   4. thereafter applying overcoat paint to said coated surface, said undercoating film consisting essentially of tar epoxy resin which comprises an antirust coating stable against organic solvents and adapted to form a three-dimensional network when cured on drying in approximately 5 to 7 days at normal temperature after coating, said antirust coating consisting essentially of: one component comprising an epoxy resin, which is curable with a member selected from the group consisting of polyamine and polyamide curing agents, to form a high molecular weight compound of three-dimensional network in the perfectly cured film which contains some unreacted epoxy and hydroxy polar groups in the compound molecule, and another component comprising a major portion of at least one component consisting of coal tar, tar-pitch, or coat-digested tar pitch, said antirust epoxy tar coat being coated directly on the metal surfaces.

2. Method of preventing coating films from peeling, according to claim 1, wherein said bonding composition contains a drop preventive agent, consisting essentially of colloid silica powder.

3. Method of preventing coating films from peeling, according to claim 1, wherein said first component is γ-glycidoxy-propyl-trimethoxy-silane, and said mixed solvent comprises methylene chloride, methyl alcohol, and cellosolve.

4. Method of preventing coating films from peeling, according to claim 3, wherein said bonding composition contains from about 1 to about 5 percent by weight of colloid silica powder.

5. Method of preventing coating films from peeling, according to claim 1, wherein said first component is paraamino-phenyl-trihydroxysilane, and said mixed solvent comprises methylene chloride, methyl alcohol and cellosolve.

6. Method of preventing coating films from peeling, according to claim 5, wherein said bonding composition contains from about 1 to about 5 percent by weight of colloid silica powder.

7. Method of preventing coating films from peeling, according to claim 1, wherein said first component is γ-methacryloxy-propyl-trimethoxy-silane, and said mixed solvent comprises methyl-isobutyl-ketone, methyl alcohol, toluene and monochlorobenzene.

8. Method of preventing coating films from peeling, according to claim 7, wherein said bonding composition contains from about 1 to about 5 percent by weight of colloid silica powder.

9. Method of preventing coating films from peeling, according to claim 1, wherein said first component is aluminum isopropylate.

10. Method of preventing coating films from peeling, according to claim 1, wherein said first component is tetra-isopropyl-titanate.

11. Method of preventing coating films from peeling, according to claim 1, wherein said first component is $Ti(O_2-CH_2-CH(CH_3)_2)_4$.

12. Method of preventing coating films from peeling, according to claim 1, in which said bonding composition comprises a mixture of
   a. from about one to about fifty percent by volume of a reaction mixture resultant from addition of from about 1.5 to about 5 mols of (i) a member selected from titanium alkoxide, aluminium alkoxide and the chelates thereof, to (ii) 1 mol of at least one epoxy bearing compound having a molecular weight up to about 1,000, and
   b. a normally liquid mixed solvent containing more than two solvents selected from at least two organic solvents selected from the group consisting of halogenated hydrocarbons, aromatic hydrocarbons, esters and ketones.

13. Method of preventing coating films from peeling, according to claim 1, wherein said bonding composition contains from about 1 to about 5 percent of colloid silica powder.

14. A method of pretreating iron and steel surfaces coated with an undercoating film which are to be protected with over-coating films, which comprises
   1. mixing together to form a bonding composition for coatings:
      a. from about 1.0 to about 30 percent by weight of a first component selected from the group consisting of para-aminophenyl-trihydroxysilane, vinyl-trichlorosilane, aryltrichlorosilane, γ-glycidoxy-propyltrimethoxysilane, vinyl-tris-(β-methoxyethoxy)-silane, vinyl-triethoxysilane, β-(3,4-epoxycyclohexyl)-ethyl-trimethoxysilane, γ-methacryloxypropyl-trimethoxysilane, n-(dimethoxy-methylsilylpropyl)-ethylenediamine, p-aminophenyl-trihydroxysilane, β-aminoethyl-triacetoxysilane, and mixtures thereof, and
      b. from about 99.0 to about 70 percent by weight of an organic normally liquid mixed solvent containing more than two solvents selected from at least two of (i) halogenated hydrocarbons, (ii) aromatic hydrocarbons, (iii) esters, and (iv) ketones,
   2. applying said bonding composition to the surface over the said undercoating film when in substantially completely cured condition,
   3. allowing said bonding composition to dry prior to the application of an overcoat paint to said surface, and
   4. thereafter applying an overcoating film to said coated surface, said undercoating film consisting essentially of tar epoxy resin which comprises an antirust coating stable against organic solvents and adapted to form a three-dimensional network when cured on drying in approximately 5 to 7 days at normal temperature after coating, said antirust coating consisting essentially of: a first component comprising an epoxy resin, which is curable with a member selected from the group consisting of polyamine and polyamide curing agents, to form a high molecular weight compound of three-dimensional network in the perfectly cured film which contains some unreacted epoxy and hydroxy polar groups in the compound molecule, and a second component comprising a major portion of at least one component consisting of coal tar, tar-pitch, or coal-digested tar pitch, said antirust epoxy tar coat being coated directly thereon.

15. A method of pretreating iron and steel surfaces, according to claim 14, wherein said bonding composition contains from about 1 to about 5 percent by weight of colloid silica powder.

* * * * *